(12) United States Patent
Pratt

(10) Patent No.: US 10,076,863 B1
(45) Date of Patent: Sep. 18, 2018

(54) QUICK RELEASE SLEEVE CHILL ROLL

(71) Applicant: Bryce Corporation, Memphis, TN (US)

(72) Inventor: John Andrew Pratt, Pleasant Plains, AR (US)

(73) Assignee: Bryce Corporation, Memphis, TX (US)

( * ) Notice: Subject to any disclaimer, the term of this patent is extended or adjusted under 35 U.S.C. 154(b) by 392 days.

(21) Appl. No.: 14/991,482

(22) Filed: Jan. 8, 2016

Related U.S. Application Data

(62) Division of application No. 14/985,873, filed on Dec. 31, 2015, now Pat. No. 9,937,641.

(51) Int. Cl.
*B29C 33/70* (2006.01)
*B29C 47/88* (2006.01)

(52) U.S. Cl.
CPC .......... *B29C 47/8845* (2013.01); *B29C 33/70* (2013.01)

(58) Field of Classification Search
CPC ......... B21B 31/07; B21B 31/08; B21B 31/12; B21B 31/14; B21B 31/106; B29C 33/70; B29C 47/884; B29C 47/8845; B29C 47/886
See application file for complete search history.

(56) References Cited

U.S. PATENT DOCUMENTS

| | | | | |
|---|---|---|---|---|
| 2,734,406 A | * | 2/1956 | O'Malley | B21B 31/07 384/615 |
| 3,871,222 A | * | 3/1975 | Lorenz | B21B 27/035 72/238 |
| 4,111,120 A | * | 9/1978 | Paulson | B41F 13/00 101/175 |
| 5,127,251 A | * | 7/1992 | Casagrande | B21B 13/005 72/239 |
| 6,071,110 A | | 6/2000 | Mikkelsen | |
| 6,074,192 A | | 6/2000 | Mikkelsen | |
| 6,409,645 B1 | | 6/2002 | Paasonen et al. | |
| 6,450,693 B1 | * | 9/2002 | Fuchs | B21B 27/03 384/538 |
| 8,910,572 B2 | | 12/2014 | Rossini | |
| 2002/0033037 A1 | * | 3/2002 | Grimmel | B21B 29/00 72/241.8 |

* cited by examiner

*Primary Examiner* — Yogendra N Gupta
*Assistant Examiner* — Emmanuel S Luk
(74) *Attorney, Agent, or Firm* — Law Office of J.L. Simunic; Joan Simunic

(57) ABSTRACT

The present invention is a method and apparatus for quick and easy rubber sleeve exchanges on chill rolls, such as are used in film extrusion processes. The apparatus includes chill roll or mandrel, a rubber sleeve covering the exterior face of the mandrel, an automated cantilever system, and an air booster. The rubber sleeve is easily removed by tilting the mandrel and inserting a layer of air between the rubber sleeve and the mandrel, thereby allowing the sleeve to slip off the mandrel and allowing for a new rubber sleeve to be placed onto the mandrel.

10 Claims, 6 Drawing Sheets

QUICK RELEASE SLEEVE CHILL ROLL

CROSS-REFERENCE TO RELATED APPLICATIONS

The present application is a divisional of U.S. patent application Ser. No. 14/985,873 filed 31 Dec. 2015, now issued as U.S. Pat. No. 9,937,641, issued on 10 Apr. 2018.

FIELD OF THE INVENTION

The invention relates to an apparatus used for plastic sheet/film extrusion, and specifically to an improvement to a rubber-sleeved chill roll used in the extrusion process.

BACKGROUND OF THE INVENTION

In plastic sheet/film extrusion, a thin film of molten polymer or melt is extruded through a die between two simultaneously fed substrates and then the layered sheet is pulled down by a nip roll assembly. As shown in FIG. 1, a typical nip roll assembly comprises a chill roll, or CI drum, and a rubber-sleeved chill roll that are aligned so as to compress the layered sheet between the CI drum and the rubber-sleeved chill roll. A back-up cooling roll is positioned to maintain the pressure from the rubber-sleeved chill roll onto the CI drum to maximize adhesion between the melt and substrates.

The substrates, now coated with the melt, gets cooled by the CI drum, which has a larger outside diameter than the other rolls. The larger outside diameter of the CI drum allows the CI drum to increase the cooling time since it has a larger area of contact with the film than any of the other rolls. After the film exits the CI drum, it is cooled and ready to go on to the next lamination stages.

Rubber sleeves are required on the smaller diameter chill roll when pulling the film due to the film's friction characteristics, and to maintain an even, flat profile. However, if the rubber gets overheated, it will eventually fail. For example, the molten polymer can easily adhere to an overheated rubber and cause a buildup on the rubber. In extreme conditions, the rubber may crack or even break from the chill roll. On the other hand, if the chill roll and CI drum temperatures are too low, adhesion between substrates and melt may be ineffective due to excessively rapid quenching of the melt. So proper temperature control is key for processing an acceptable film.

The rubber sleeves may be composed of a variety of different materials and may have different surface finishes depending on the intended use. Each sleeve material has a unique temperature range for optimum performance. Because of this, whenever there is a job change on a production line and the new job requires a rubber sleeve with a different profile, the rubber sleeves on the chill rolls need to be exchanged. Further, normal wear and tear during an extended production run can cause the rubber sleeve to fail and require replacement.

In the prior art methods, in order to do a rubber sleeve replacement the entire rubber-sleeved chill roll needs to be removed from the machine and then be replaced with a new roll. The removed rubber-sleeved chill roll can be repaired on a lathe until its surface is even and flat again, though there is a limit to how many times it can be repaired. Elasticity decreases as rubber thickness decreases, failures can happen if significant torque or shear is applied to a rubber that is too thin. On the other hand, if the rubber is too thick, it won't dissipate heat too well and cause an over heat, so minimum and maximum outside diameters must be carefully determined. This can be a time-consuming process, which may be further complicated if the rubber-sleeved chill roll is not easily accessible.

SUMMARY OF THE PRESENT INVENTION

The present development is a quick release sleeve chill roll assembly designed to allow for quick and easy rubber sleeve exchanges in order to reduce machine down time. The chill roll assembly comprises a chill roll or mandrel, rubber sleeves, an automated cantilever system, and an air booster. In a preferred embodiment, the chill roll assembly comprises a tapered chill roll or mandrel, tapered rubber sleeves, an automated cantilever system, and an air booster.

The rubber sleeve is easily removed by tilting the mandrel and inserting a layer of air between the rubber sleeve and the mandrel, thereby allowing the sleeve to slip off the mandrel and allowing for a new rubber sleeve to be placed onto the mandrel. The quick release sleeve chill roll assembly of the present invention significantly reduces the time required to change the rubber sleeve on the chill roll. For example, a process that typically takes an average of forty-five minutes using prior art methods can be accomplished in less than one minute using the apparatus and method of the present invention.

DETAILED DESCRIPTION OF THE PRESENT DEVELOPMENT

Figure 1:
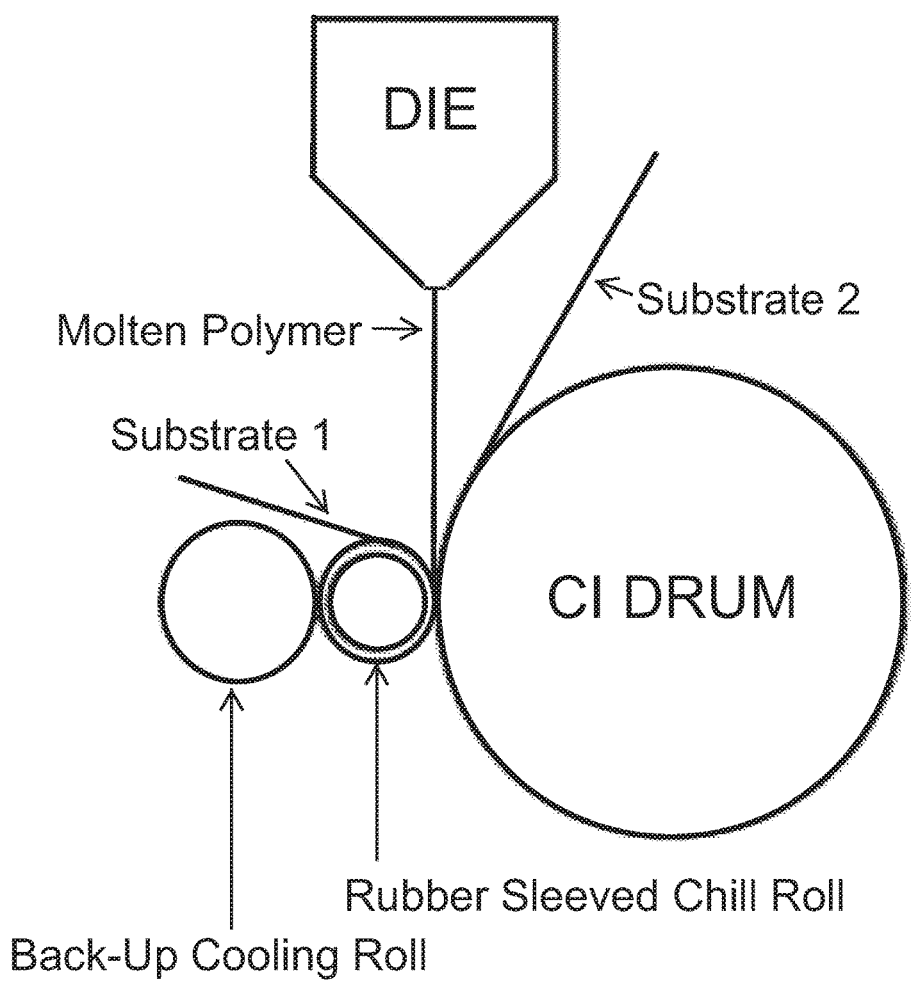
FIG. 1 is a schematic of a nip roll assembly with a molten polymer extruded between two substrates feeding into the nip roll assembly.
Figure 2A:
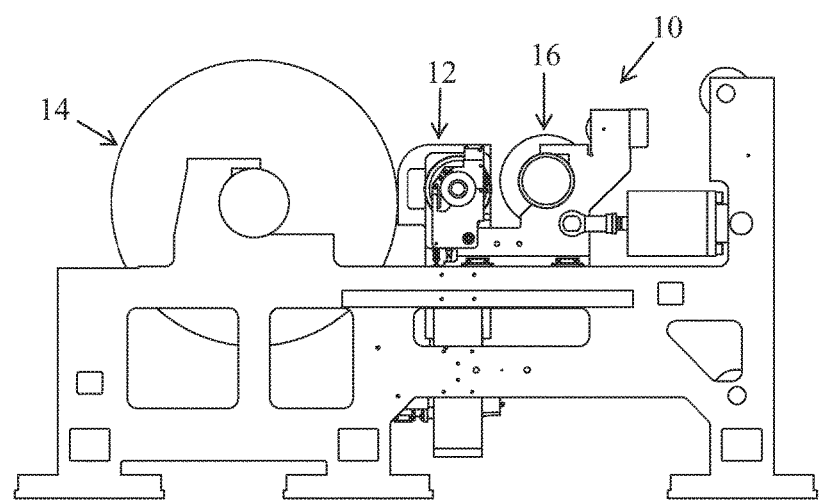
FIG. 2A is a front view of a nip roll assembly portion of a production line with the mandrel and back-up cooling roll in operational position.
Figure 2B:
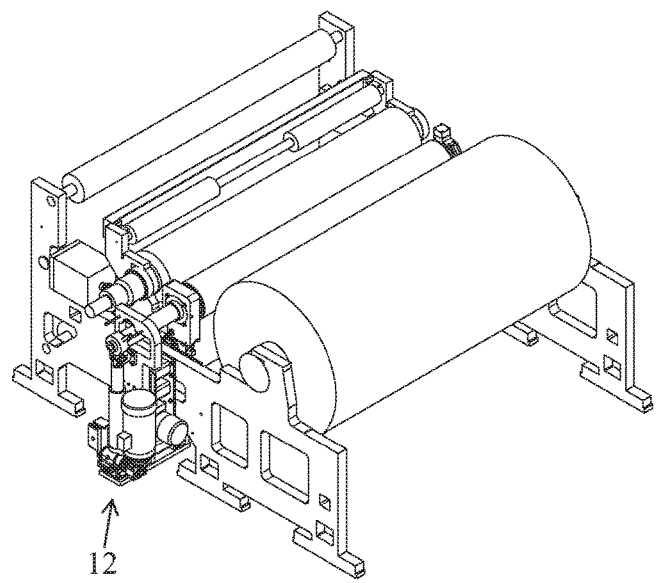
FIG. 2B is a back view of the nip roll assembly of FIG. 2A.

The present development is a rubber-sleeved chill roll assembly designed to allow for quick and easy rubber sleeve exchanges in order to reduce machine down time. As shown in FIGS. 2A and 2B, the rubber-sleeved chill roll assembly 12 is intended to be used in a nip roll assembly 10 in conjunction with a chill roll or CI drum 14, and a back-up cooling roll 16. In the operational mode, the back-up cooling roll 16 applies a pressure against the sleeved chill roll 12 thereby pushing the chill roll against the CI drum 14.

The present development is also a method for removing and replacing sleeves on a chill roll or mandrel. It is anticipated that the mandrel will be covered on its exterior face with a removable sleeve. The sleeve is removed by initially forcing a layer of air between the exterior face of the mandrel and the sleeve. This causes the sleeve to release from the mandrel. Once the sleeve is released from the mandrel, the sleeve can be manually removed. With air continuing to flow to create the air layer around the exterior face of the mandrel, a new sleeve is placed on the mandrel while maintaining an air layer between the mandrel and the sleeve. The air flow is then discontinued, the air layer is allowed to dissipate from between the mandrel and the sleeve, and the sleeve then hugs or fits snuggly against the mandrel. In a first exemplary embodiment, the mandrel and sleeve are tapered to allow for easier removal. In a second exemplary embodiment, the mandrel can be cantilevered to allow for easier sleeve removal.

The chill roll assembly 12 comprises a chill roll or mandrel 20, a rubber sleeve 22, an automated cantilever system 30, and an air booster 38. The mandrel 20 defines a cantilever end 24, a free end 26, and a face 28. The tapered rubber sleeve 22 is positioned over the mandrel 20 so as to cover essentially the entire face 28. The mandrel 20 is secured to and in communication with the cantilever system 30 at the cantilever end 24. The free end 26 may be secured in position during use and released for a rubber sleeve change. In a preferred embodiment, the mandrel is tapered such that the cantilevered end 24 has a larger diameter than the free end 26, and the sleeve 22 is tapered to complement the tapering of the mandrel 20.

The mandrel 20 is cooled by an internal chilled water means, such as a system wherein chilled water is forced to circulate through the interior of the roll by being fed in through a small hole and exiting through a second small hole on an end of the mandrel 20. A variety of means for chilling mandrels are known in the art and may be used in the present assembly. In a preferred embodiment, the entry and exit points for the chilled water are located on the cantilever end 24 of the mandrel 20.

The mandrel 20 further includes a plurality of apertures (not shown) covering its face 28. The air booster 38 is in communication with the mandrel 20 such that the air booster 38 can feed air into the interior of the mandrel 20. As the air is fed into the mandrel 20, the air is forced through the apertures in the face 28 of the mandrel 20. In a preferred embodiment, the air booster 38 is positioned on the cantilever end 24 of the mandrel 20.

Figure 3:
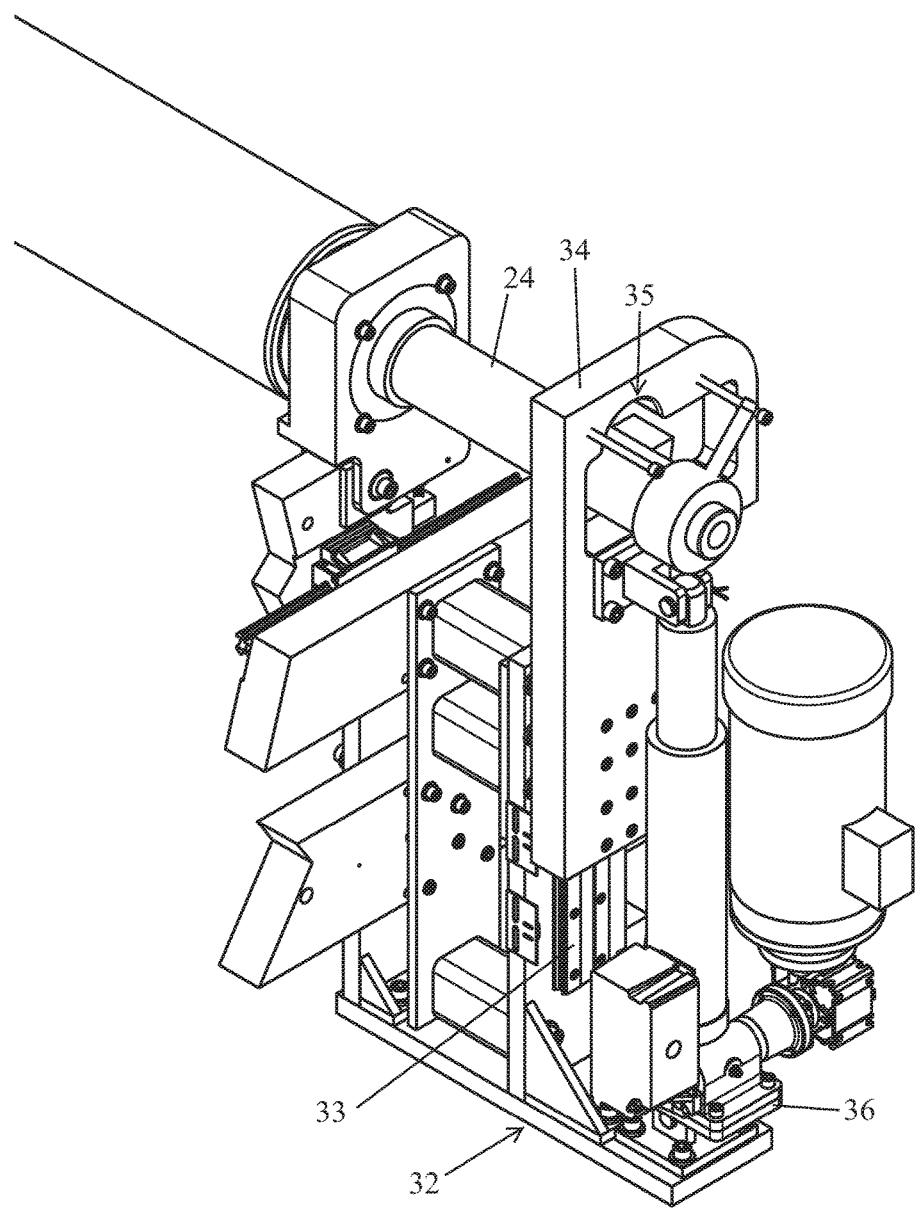
FIG. 3 is a perspective view of the automated cantilever system for the nip roll assembly of FIG. 2A.

As shown in FIG. 3, the automated cantilever system 30 comprises a frame support 32, a cantilever plate 34, and a linear actuator 36. A linear rail 33 is mounted vertically on the frame support 32 such that the cantilever plate 34 can be reversibly affixed to the rail 33 and can be raised and lowered by traveling along the rail 33. The cantilever plate 34 is further attached to the linear actuator 36, and is raised and lowered by the actuator 36, as is known in the art.

Figure 4:
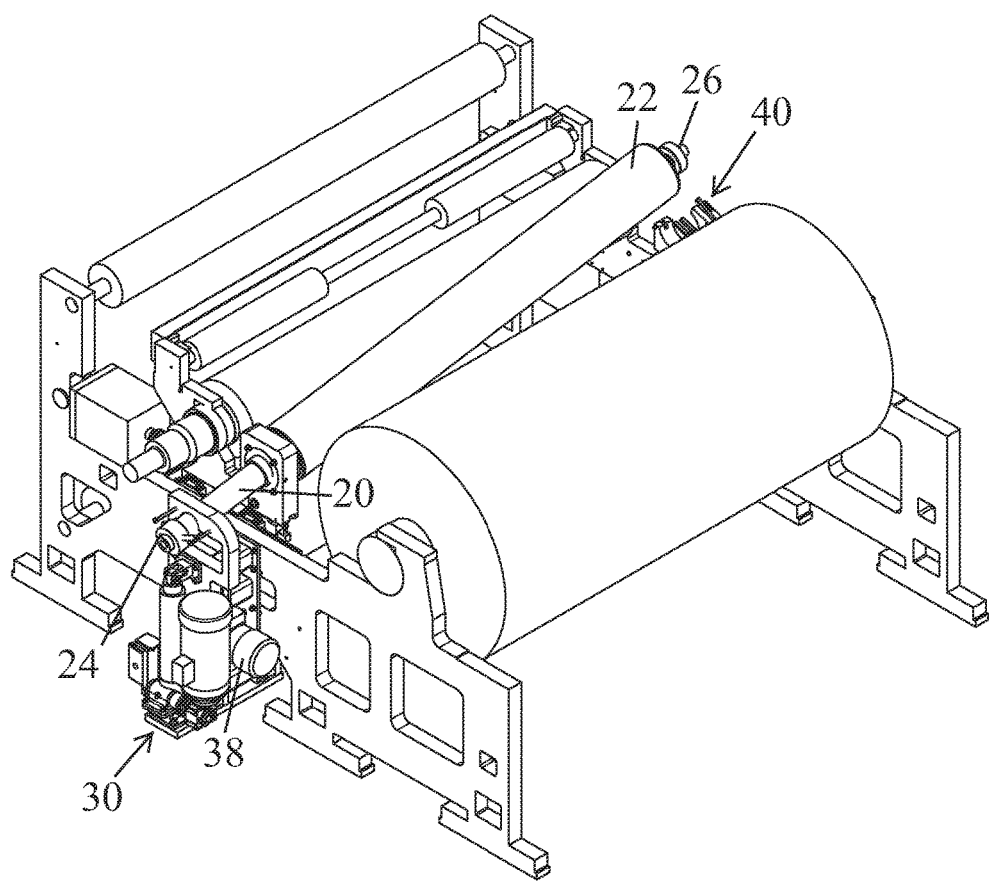
FIG. 4 is a perspective view of the nip roll assembly of FIG. 2A with the mandrel in the cantilever up position.

The cantilever plate 34 includes an aperture with a groove 35 through which the cantilever end 24 of the mandrel 20 projects when the cantilever plate 34 is affixed to the linear rail 33. When the cantilever plate 34 is in the raised or resting position, the mandrel 20 is in an essentially horizontal position, meaning that the cantilever end 24 and the free end 26 of the mandrel 20 define a line essentially parallel to a horizontal plane. In the horizontal position, the mandrel 20 is ready to operate in conjunction with the CI drum 14 to receive a substrate/melt/substrate material and the cantilever end 24 can move freely within the grooved aperture 35. When the cantilever plate 34 is lowered, the cantilever end 24 of the mandrel 20 is engaged by the groove 35 of the cantilever plate 34, causing then cantilever end 24 of the mandrel 20 to be lowered and simultaneously causing the free end 26 to raise from the horizontal position, as shown in FIG. 4.

Figure 5:
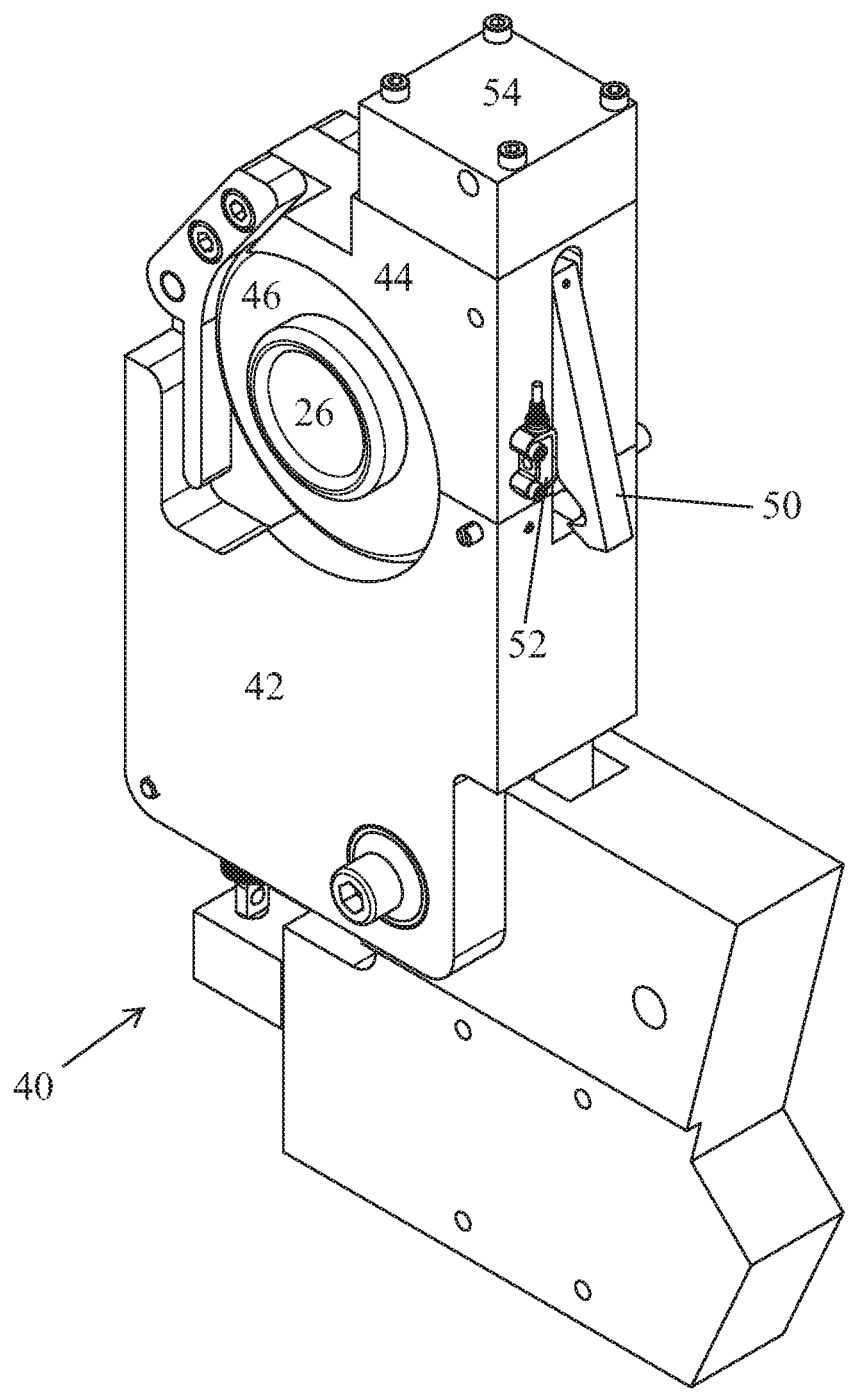
FIG. 5 is a perspective view of the latched bearing block on the free end of the mandrel when the mandrel is in the horizontal position.

The free end 26 of the mandrel 20 is secured during use by a latched bearing block 40 have a base 42 and a cap 44. As shown in FIGS. 4 and 5, the latched bearing block 40 further comprises an aperture 46 through which the free end 26 of the mandrel 20 can project when secured in the latched bearing block 40, a fork arm 48 or similar means to allow the bearing block to open to release the mandrel 20, a latch 50, and a latch sensor 52. The latch 50 holds the latched bearing block 40 in the closed position. The latch sensor 52 detects when the latch 50 is secured. Optionally, the latched bearing block 40 may include an air cylinder 54 that may be programmed to open the latch 50.

Figure 6A:
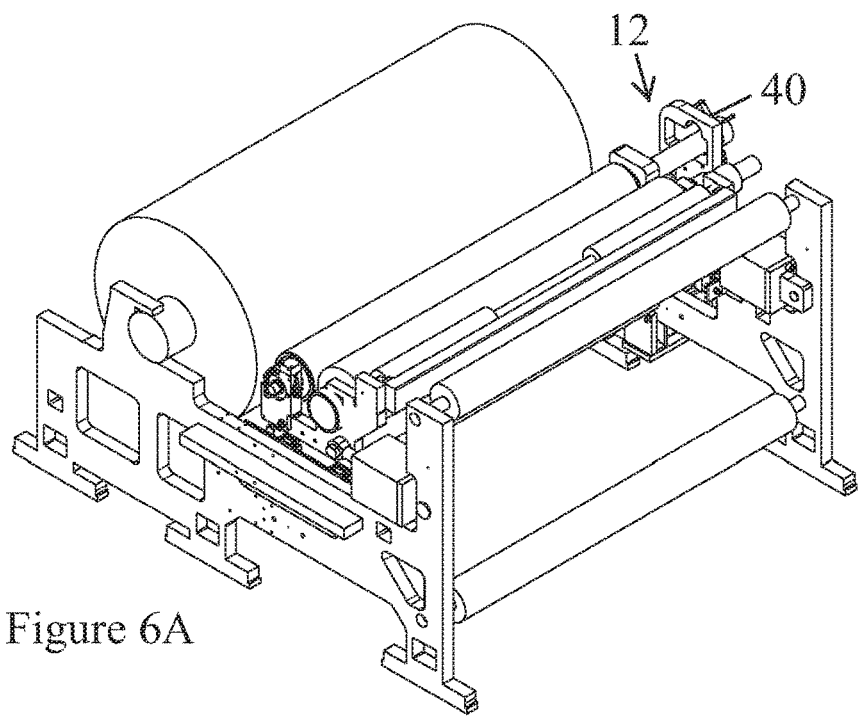
FIG. 6A is a front view of the nip roll assembly of FIG. 2A with the back-up cooling roll retracted and the mandrel in a resting position; and, FIG. 6B is a back view of the nip roll assembly of FIG. 6A.
Figure 6B:
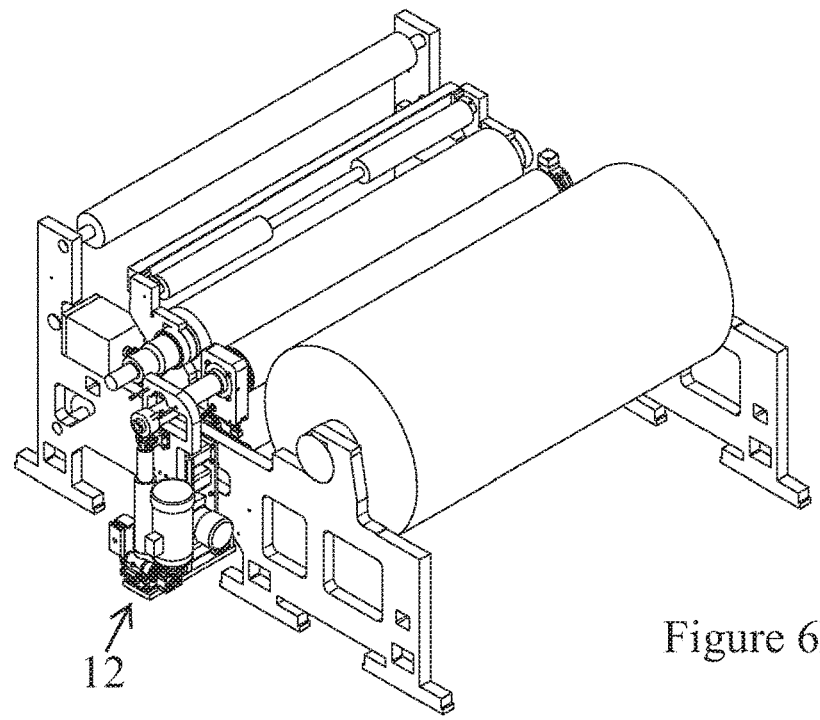

Generally, to change the rubber sleeve 22, the back-up cooling roll 16 is retracted as shown in FIGS. 6A and 6B thereby ensuring that production has stopped and allowing the mandrel 20 to shift to a resting position away from the CI drum 14. The latch 50 of the latched bearing block 40 is opened and the cap 44 is opened to allow the latched bearing block 40 to release the free end 26 of the mandrel 20. The linear actuator 36 is then retracted causing the cantilever plate 34 to move downward on the linear rail 33. As the cantilever plate 34 moves downward, the groove 35 engages the cantilever end 24 of the mandrel 20 causing the mandrel 20 to be cantilevered with the cantilever end 24 being the lower side and the free end 26 being the elevated side.

Once the mandrel 20 is cantilevered, the air booster 38 is activated. The air booster 38 forces air into the mandrel 20 and the air exits through the apertures in the face 28 creating an air layer between the rubber sleeve 22 and the mandrel 20. The air layer effectively separates the rubber sleeve 22 from the mandrel 20. In a preferred embodiment, the both the rubber sleeve and the mandrel are slightly tapered so that each are larger near the cantilevered end 24 than near the free end 26. With tapering, the rubber sleeve can gently shoot out from the mandrel, allowing the operator to remove the sleeve and replace it with a different one. Optionally, the mandrel may have a small shoulder to better position the rubber sleeve.

After the new rubber sleeve has been positioned on the mandrel, the air booster is turned off allowing the sleeve to hug the mandrel. The linear actuator 36 is then extended causing the cantilever plate 34 to move upward on the linear rail 33. As the cantilever plate 34 moves upward, the free end 26 of the mandrel 20 slowly drops back into the latched bearing block 40. When the mandrel 20 is fully dropped, the cap 44 is closed, the latch 50 is closed, and the rubber-sleeved mandrel is ready for operation or in an operational mode. Optionally, the closing process may be automated; for example, as the free end of the mandrel moves downward a bearing may make contact with the fork arm causing the cap to close when the mandrel is fully dropped. The latch may then be activated to be closed as the back-up cooling roll begins to move forward pressing the mandrel and rubber sleeve against the CI drum.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Thus, for example, reference to "an aperture" includes a plurality of such apertures, and so forth.

It is understood that, in light of a reading of the foregoing description and drawings, those with ordinary skill in the art will be able to make changes and modifications to the present invention without departing from the spirit or scope of the invention, as defined herein. For example, those skilled in the art may use a different type of latched bearing block provided it serves to support one end of the mandrel during production and can release the mandrel enough to allow for sleeve removal.

What is claimed is:

1. An apparatus for removing and replacing sleeves on a chill roll or mandrel comprising:
   (a) a mandrel which defines an exterior face, a first end having a diameter and a second end having a diameter, wherein the first end and the second end lie essentially along a line parallel to a horizontal plane;
   (b) a first sleeve configured to cover the exterior face of the mandrel and to fit snuggly against the mandrel;
   (c) a means to cantilever the mandrel so that when the mandrel is cantilevered the first end is lower than the second end relative to a horizontal plane;
   (d) a means to force a layer of air between the exterior face of the mandrel and the sleeve; and,
   (e) a second sleeve configured to cover the exterior face of the mandrel and to fit snuggly against the mandrel wherein the first sleeve initially covers the mandrel and can be separated and removed from the mandrel by causing a layer of air to form between the exterior face of the mandrel and the first sleeve, and wherein the second sleeve can be inserted over the exterior face of the mandrel after the first sleeve is removed and while a layer of air is maintained across the face of the mandrel, and then the second sleeve can be caused to fit snuggly against the mandrel by removing the air layer.

2. The apparatus of claim 1 wherein the mandrel is tapered so the first end has a larger diameter than the second end, and the first sleeve and the second sleeve are tapered to complement the tapering of the mandrel.

3. The apparatus of claim 1 wherein the means to force a layer of air between the exterior face of the mandrel and the sleeve is an air booster.

4. The apparatus of claim 1 wherein the means to cantilever the mandrel comprises a frame support, a cantilever plate, a linear actuator and a linear rail, wherein the linear rail is mounted vertically on the frame support such that the cantilever plate can be reversibly affixed to the rail and can be raised and lowered by traveling along the rail, and wherein the raising and lowering of the cantilever plate is controlled by the linear actuator, and wherein the cantilever plate includes an aperture with a groove through which the first end of the mandrel projects when the cantilever plate is affixed to the linear rail so that as the cantilever plate is lowered the mandrel is cantilevered such that the first end is lower than the second end relative to a horizontal plane, and as the cantilever plate is raised the mandrel is re-oriented so the first end and the second end lie essentially along a line parallel to a horizontal plane.

5. An apparatus for removing and replacing sleeves on a chill roll or mandrel comprising:
   (a) a nip roll assembly comprising a CI drum, a sleeved mandrel, and a back-up cooling roll, wherein the sleeved mandrel is positioned between the CI drum and the back-up cooling roll, and the back-up cooling roll and the sleeved mandrel can move relative to the CI drum so that the nip roll assembly can define an operational mode wherein the back-up cooling roll can apply pressure to the sleeved mandrel forcing the sleeved mandrel to make contact with the CI drum, and wherein the sleeved mandrel defines an exterior face, a first end having a diameter and a second end having a diameter, and wherein the first end and the second end lie essentially along a line parallel to a horizontal plane, and wherein the exterior face of the mandrel is covered with a first removable sleeve;
   (b) a means to cantilever the mandrel so that when the mandrel is cantilevered such that the first end is lower than the second end relative to a horizontal plane;
   (c) a means to force a layer of air between the exterior face of the mandrel and the first sleeve; and,
   (d) a second removable sleeve configured to cover the exterior of the mandrel and to fit snuggly against the mandrel, wherein the second sleeve can be inserted onto the mandrel by causing the back-up cooling roll to retract from the sleeved mandrel allowing the mandrel to shift to a resting position away from the CI drum, and then the mandrel is cantilevered, and then the layer of air is generated between the exterior face of the mandrel and the first sleeve, and then the first sleeve is removed from the mandrel, and then the second sleeve is inserted onto the exterior of the mandrel while maintaining an air layer between the mandrel and the second sleeve, and then the air flow is discontinued allowing the air layer to dissipate from between the mandrel and the second sleeve so the sleeve can hug the mandrel, and then causing the mandrel to be re-oriented so the first end and the second end lie essentially along a line parallel to a horizontal plane.

6. The apparatus of claim 5 wherein the mandrel is tapered so the first end has a larger diameter than the second end, and the sleeve is tapered to complement the tapering of the mandrel.

7. The apparatus of claim 5 wherein the means to force a layer of air between the exterior face of the mandrel and the first sleeve and between the exterior face of the mandrel and the second sleeve is an air booster.

8. The apparatus of claim 7 wherein the mandrel has a plurality of apertures in the exterior face and the air booster is configured to force air into the mandrel and the air exits the mandrel through the apertures of the mandrel, and wherein the exiting air creates an air layer between the sleeve and the exterior face of the mandrel.

9. The apparatus of claim 5 further including a latched bearing block configured to stabilize the second end of the mandrel when the mandrel is in operational mode, and further configured to allow the latched bearing block to release the second end of the mandrel so that the second end can move freely relative to the latched bearing block after the back-up cooling roll retracts from the sleeved mandrel and the mandrel shifts to a resting position away from the CI drum and before causing the mandrel to be cantilevered such that the first end is lower than the second end relative to a horizontal plane, and to allow the latched bearing block to stabilize the second end of the mandrel when the mandrel is in operational mode after the mandrel is re-oriented so the first end and the second end lie essentially along a line parallel to a horizontal plane.

10. The apparatus of claim 5 wherein the means to cantilever the mandrel comprises a frame support, a cantilever plate, a linear actuator and a linear rail, wherein the linear rail is mounted vertically on the frame support such that the cantilever plate can be reversibly affixed to the rail and can be raised and lowered by traveling along the rail, and wherein the raising and lowering of the cantilever plate is controlled by the linear actuator, and wherein the cantilever plate includes an aperture with a groove through which the first end of the mandrel projects when the cantilever plate is affixed to the linear rail so that as the cantilever plate is lowered the mandrel is cantilevered such that the first end is lower than the second end relative to a horizontal plane, and as the cantilever plate is raised the mandrel is re-oriented so the first end and the second end lie essentially along a line parallel to a horizontal plane.

* * * * *